(12) United States Patent
Zha

(10) Patent No.: US 12,079,425 B2
(45) Date of Patent: Sep. 3, 2024

(54) DISPLAY PANEL AND DRIVING METHOD THEREOF

(71) Applicant: Shenzhen China Star Optoelectronics Semiconductor Display Technology Co., Ltd., Guangdong (CN)

(72) Inventor: Bao Zha, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 134 days.

(21) Appl. No.: 17/270,877

(22) PCT Filed: Jan. 21, 2021

(86) PCT No.: PCT/CN2021/073114
§ 371 (c)(1),
(2) Date: Sep. 26, 2023

(87) PCT Pub. No.: WO2022/141697
PCT Pub. Date: Jul. 7, 2022

(65) Prior Publication Data
US 2024/0036677 A1 Feb. 1, 2024

(30) Foreign Application Priority Data
Dec. 30, 2020 (CN) .......................... 202011606397.0

(51) Int. Cl.
*G06F 3/045* (2006.01)
*G06F 3/041* (2006.01)
(Continued)

(52) U.S. Cl.
CPC .......... *G06F 3/0418* (2013.01); *G06F 3/0412* (2013.01); *G06F 3/04166* (2019.05);
(Continued)

(58) Field of Classification Search
CPC .. G06F 3/0418; G06F 3/0412; G06F 3/04166; G06F 3/0443; G06F 2203/04107;
(Continued)

(56) References Cited

U.S. PATENT DOCUMENTS

2013/0063400 A1 3/2013 Ahn et al.
2015/0029157 A1 1/2015 Wang
(Continued)

FOREIGN PATENT DOCUMENTS

CN 102645999 8/2012
CN 103207720 7/2013
(Continued)

*Primary Examiner* — Thuy N Pardo

(57) ABSTRACT

The present disclosure provides a display panel and a driving method thereof. The display panel includes a substrate, a light control device, a display device, and a touch device. The light control device, the display device, and the touch device are disposed on the substrate. Wherein, the light control device, the display device, and the touch device operate in a first time period, a second time period, and a third time period, respectively, and any two of the first time period, the second time period, and the third time period are not intersected.

18 Claims, 3 Drawing Sheets

(51) Int. Cl.
*G06F 3/044* (2006.01)
*G09G 3/36* (2006.01)
*G02F 1/1333* (2006.01)
*G02F 1/1362* (2006.01)
*G02F 1/1368* (2006.01)

(52) U.S. Cl.
CPC ......... *G06F 3/0443* (2019.05); *G09G 3/3648* (2013.01); *G02F 1/13338* (2013.01); *G02F 1/136286* (2013.01); *G02F 1/1368* (2013.01); *G06F 2203/04107* (2013.01); *G09G 2310/08* (2013.01); *G09G 2320/0209* (2013.01); *G09G 2354/00* (2013.01); *G09G 2360/144* (2013.01)

(58) Field of Classification Search
CPC .. G06F 3/042; G09G 3/3648; G09G 2310/08; G09G 2320/0209; G09G 2354/00; G09G 2360/144; G02F 1/13338; G02F 1/136286; G02F 1/1368
USPC .......................................... 345/156, 173, 174
See application file for complete search history.

(56) References Cited

U.S. PATENT DOCUMENTS

| | | | | |
|---|---|---|---|---|
| 2019/0146619 | A1* | 5/2019 | Kurasawa | G02F 1/13338 345/173 |
| 2019/0339805 | A1* | 11/2019 | Suzuki | G06F 3/0447 |
| 2020/0110485 | A1* | 4/2020 | Lee | G06F 3/044 |
| 2020/0272267 | A1* | 8/2020 | Xu | G09G 3/20 |
| 2021/0333926 | A1* | 10/2021 | Wang | G06V 40/1318 |
| 2022/0214789 | A1* | 7/2022 | Yamazaki | G06F 3/0488 |
| 2024/0094574 | A1* | 3/2024 | Kimura | G06F 3/0446 |

FOREIGN PATENT DOCUMENTS

| | | |
|---|---|---|
| CN | 104020904 | 9/2014 |
| CN | 104200784 | 12/2014 |
| CN | 104484077 | 4/2015 |
| CN | 107342308 | 11/2017 |
| CN | 107480639 | 12/2017 |
| CN | 110765888 | 2/2020 |
| CN | 111696494 | 9/2020 |
| CN | 112114700 | 12/2020 |
| TW | 201101138 | 1/2011 |

* cited by examiner

DISPLAY PANEL AND DRIVING METHOD THEREOF

RELATED APPLICATIONS

This application is a National Phase of PCT Patent Application No. PCT/CN2021/073114 having International filing date of Jan. 21, 2021, which claims the benefit of priority of Chinese Patent Application No. 202011606397.0 filed on Dec. 30, 2020. The contents of the above applications are all incorporated by reference as if fully set forth herein in their entirety.

FIELD AND BACKGROUND OF THE INVENTION

The present disclosure relates to the field of display technology, and more particularly, to manufacturing of a display device, and specifically to a display panel and a driving method thereof.

With consumers' simultaneous demand for touch function and light control function, a technology for integrating a touch device and a light control device into a display device is inevitably developed.

Currently, for embedding the touch device and the light control device into the display panel by using an in-cell technology, when the touch device, the light control device, and the display device are simultaneously operated, a parasitic capacitance exists between an electrode in the touch device and an electrode in the light control device, so signals on the two electrodes are mutually interfered. In addition, the electrode in the touch device, the electrode in the light control device, and an electric field for driving liquid crystals in the display device are mutually interfered, thereby reducing reliability of operation of the touch device, the light control device, and the display device in the display panel.

Therefore, it is necessary to provide a display panel and a driving method thereof to improve the reliability of the operation of the touch device, the light control device, and the display device in the display panel.

SUMMARY OF THE INVENTION

Technical Problem

It is an object of the present disclosure to provide a display panel and a driving method thereof. On the premise that a light control device, a display device, and a touch device are disposed on a substrate, the light control device, the display device, and the touch device are set to operate in a first time period, a second time period, and a third time period, respectively, and any two of the first time period, the second time period, and the third time period are not intersected, thereby solving a problem that a parasitic capacitance exists between an electrode the touch device and an electrode in the light control device, causing crosstalk of signals on the two electrodes, and the electrode in the touch device, the electrode in the light control device, and an electric field used for driving liquid crystals in the display device are mutually interfered, thereby reducing reliability of operation of the touch device, the light control device, and the display device in the display panel.

Technical Solution

An embodiment of the present disclosure provides a display panel, wherein the display panel comprises a substrate, a light control device, a display device, and a touch device, the light control device, the display device, and the touch device are disposed on the substrate, the light control device, the display device, and the touch device are respectively operated in a first time period, a second time period, and a third time period, and any two of the first time period, the second time period, and the third time period are not intersected, wherein the light control device comprises a photosensitive thin film transistor and a switching thin film transistor which are electrically connected to each other, the display device comprises a display thin film transistor, and the touch device comprises a touch thin film transistor, the photosensitive thin film transistor, the switching thin film transistor, the display thin film transistor, and the touch thin film transistor are disposed in a same layer and formed of the same material;

Wherein the display panel further comprises:

A light control scan line electrically connected to the light control device so that the light control device operates in the first time period;

A display scan line electrically connected to the display device so that the display device operates in the second time period; and A touch scan line electrically connected to the touch device so that the touch device operates in the third time period.

In an embodiment, the touch device further comprises:

A touch electrode configured to sense external touch and generate a touch signal, wherein a source electrode of the touch thin film transistor is electrically connected to the touch electrode;

A touch receiving line, wherein a drain electrode of the touch thin film transistor is electrically connected to the touch receiving line, and the touch receiving line receives the touch signal through the touch thin film transistor.

In an embodiment, the touch electrode and the source electrode of the touch thin film transistor are integrally formed so that the source electrode of the touch thin film transistor is electrically connected to the touch electrode.

In an embodiment, the photosensitive thin film transistor is configured to sense external light and generate a photoelectric signal, a source electrode of the switching thin film transistor and a drain electrode of the photosensitive thin film transistor are electrically connected such that the photoelectric signal is transmitted to the switching thin film transistor, and the light control device further comprises:

A photosensitive read line electrically connected to a drain electrode of the switching thin film transistor, and a gate electrode of the switching thin film transistor is electrically connected to the light control scan line to control the photosensitive read line to receive the photoelectric signal through the switching thin film transistor.

In an embodiment, the display panel further comprises:

A passivation layer covering the photosensitive thin film transistor, the switching thin film transistor, the display thin film transistor, the touch thin film transistor, and the touch electrode; and A plurality of common electrodes on the passivation layer, each of the common electrodes and the corresponding display thin film transistor are oppositely disposed.

In an embodiment, the display panel further comprises:

A color film substrate opposite to the substrate, and the light control device, the display device and the touch device are disposed on one side of the substrate close to the color film substrate.

In an embodiment, the color film substrate comprises a color film base, a plurality of filters, and a plurality of shielding portions;

Wherein the plurality of filters and the plurality of shielding portions are disposed on one side of the color film base close to the substrate, each of the filters is disposed opposite to the corresponding display device, and each of the shielding portions is disposed between two adjacent filters of different colors.

An embodiment of the present disclosure provides a display panel, wherein the display panel comprises a substrate, a light control device, a display device, and a touch device, the light control device, the display device, and the touch device are disposed on the substrate;

Wherein the light control device, the display device, and the touch device are respectively operated in a first time period, a second time period, and a third time period, and any two of the first time period, the second time period, and the third time period are not intersected.

In an embodiment, the display panel further comprises:

A light control scan line electrically connected to the light control device so that the light control device operates in the first time period;

A display scan line electrically connected to the display device so that the display device operates in the second time period; and A touch scan line electrically connected to the touch device so that the touch device operates in the third time period.

In an embodiment, the light control device comprises a photosensitive thin film transistor and a switching thin film transistor which are electrically connected to each other, the display device comprises a display thin film transistor, and the touch device comprises a touch thin film transistor;

Wherein the photosensitive thin film transistor, the switching thin film transistor, the display thin film transistor, and the touch thin film transistor are disposed in a same layer and formed of the same material.

In an embodiment, the touch device further comprises:

A touch electrode configured to sense external touch and generate a touch signal, wherein a source electrode of the touch thin film transistor is electrically connected to the touch electrode;

A touch receiving line, wherein a drain electrode of the touch thin film transistor is electrically connected to the touch receiving line, and the touch receiving line receives the touch signal through the touch thin film transistor.

In an embodiment, the touch electrode and the source electrode of the touch thin film transistor are integrally formed so that the source electrode of the touch thin film transistor is electrically connected to the touch electrode.

In an embodiment, the photosensitive thin film transistor is configured to sense external light and generate a photoelectric signal, a source electrode of the switching thin film transistor and a drain electrode of the photosensitive thin film transistor are electrically connected such that the photoelectric signal is transmitted to the switching thin film transistor, and the light control device further comprises:

A photosensitive read line electrically connected to a drain electrode of the switching thin film transistor, and a gate electrode of the switching thin film transistor is electrically connected to the light control scan line to control the photosensitive read line to receive the photoelectric signal through the switching thin film transistor.

In an embodiment, the display panel further comprises:

A passivation layer covering the photosensitive thin film transistor, the switching thin film transistor, the display thin film transistor, the touch thin film transistor, and the touch electrode; and A plurality of common electrodes on the passivation layer, each of the common electrodes and the corresponding display thin film transistor are oppositely disposed.

In an embodiment, the display panel further comprises:

A color film substrate opposite to the substrate, and the light control device, the display device and the touch device are disposed on one side of the substrate close to the color film substrate.

In an embodiment, the color film substrate comprises a color film base, a plurality of filters, and a plurality of shielding portions;

Wherein the plurality of filters and the plurality of shielding portions are disposed on one side of the color film base close to the substrate, each of the filters is disposed opposite to the corresponding display device, and each of the shielding portions is disposed between two adjacent filters of different colors.

An embodiment of the present disclosure provides a driving method of a display panel, wherein the driving method is applicable to the display panel as above, the driving method comprises:

Driving the light control device to operate in the first time period;

Driving the display device to operate in the second time period;

Driving the touch device to operate in the third time period, with no intersection of any two of the first time period, the second time period, and the third time period.

In an embodiment, the display panel further comprises a light control scan line, a display scan line, and a touch scan line, wherein the light control scan line is electrically connected to the light control device, the display scan line is electrically connected to the display device, and the touch scan line is electrically connected to the touch device; wherein, The step of driving the light control device to operate in the first time period comprises driving the light control scan line to drive the light control device to operate in the first time period;

The step of driving the display device to operate in the second time period comprises driving the display scan line to drive the display device to operate in the second time period;

The step of driving the touch device to operate in the third time period comprises driving the touch scan line to drive the touch device to operate in the third time period.

Advantageous Effect

The present disclosure provides a display panel and a driving method thereof. The display panel comprises a substrate, a color film substrate, a light control device, a display device, and a touch device. The substrate and the color film substrate are oppositely disposed, the light control device, the display device, and the touch device are disposed on a side of the substrate close to the color film substrate, and the light control device, the display device, and the touch device are set to operate in a first time period, a second time period, and a third time period, respectively, with no intersection of any two of the first time period, the second time period, and the third time period. In the present solution, the light control device, the display device, and the touch device are set to operate at different time periods, that is, to prevent simultaneous operation of the three, so that parasitic capacitance between an electrode in the touch device and an electrode in the light control device can be reduced to reduce crosstalk of signals on the two electrodes, and a phenomenon that the electrode in the touch device, the electrode in the light control device, and an electric field for driving liquid crystals in the display device are mutually interfered is weakened, thereby improving the reliability of the operation of the touch device, the light control device, and the display device in the display panel.

BRIEF DESCRIPTION OF THE SEVERAL VIEWS OF THE DRAWINGS

The technical solution and other beneficial effects of the present disclosure will be apparent from the following detailed description of specific embodiments thereof, taken in conjunction with the accompanying drawings.

DESCRIPTION OF SPECIFIC EMBODIMENTS OF THE INVENTION

Figure 1:
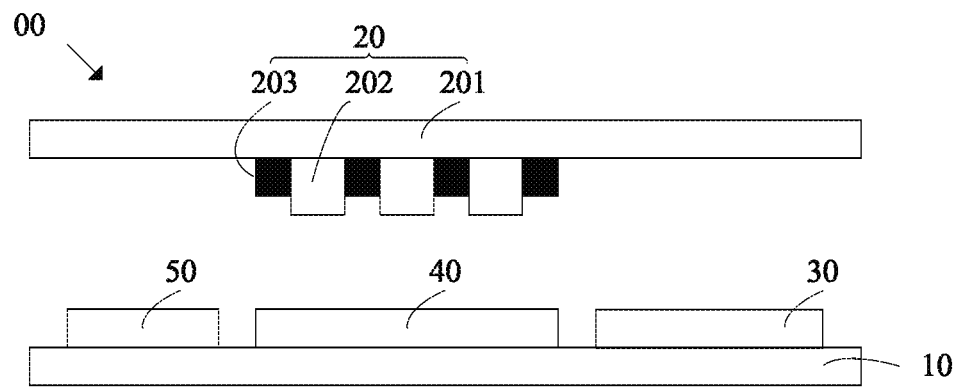
FIG. 1 is a schematic cross-sectional view of a display panel according to an embodiment of the present disclosure.

In the description of the present disclosure, it should be understood that the orientation or positional relationship indicated by the terms "upper", "near", "far away", "row", "column", etc. are based on the orientation or positional relationship shown in the drawings. The upper position or positional relationship is only for the convenience of describing the present disclosure and simplifying the description, rather than indicating or implying that the pointed device or element must have a specific orientation, be constructed and operated in a specific orientation, and therefore cannot be understood as a limitation of the present disclosure. In addition, the terms "first", "second", etc. are only used for descriptive purposes, and cannot be understood as indicating or implying relative importance or implicitly indicating the number of indicated technical features. Therefore, the features defined with "first" and "second" may explicitly or implicitly include one or more of the features. In the description of the present disclosure, "multiple" means two or more. Unless otherwise specifically defined, "electrically connected" means that the two are electrically connected, and are not limited to direct connection or indirect connection.

In addition, it should be noted that the drawings provide only structures and steps in close relation to the present disclosure, and that details not substantially related to the disclosure are omitted in order to simplify the drawings and make the disclosure point clear, rather than indicating that the apparatus in practice is the same as those in the drawings and is not intended to be limiting of the apparatus in practice.

The present disclosure provides a display panel including but not limited to the following embodiments.

In one embodiment, as shown in FIG. 1, the display panel 00 comprises a substrate 10, a light control device 30, a display device 40, and a touch device 50. The light control device 30, the display device 40, and the touch device 50 are disposed on the substrate 10. Wherein, the light control device 30, the display device 40, and the touch device 50 operate in a first time period, a second time period, and a third time period, respectively, and any two of the first time period, the second time period, and the third time period are not intersected. Further, the display panel 00 further comprises a color film substrate 20, the color film substrate 20 and the substrate 10 are oppositely disposed, and the light control device 30, the display device 40 and the touch device 50 are disposed on one side of the substrate 10 close to the color film substrate 20.

It should be noted that the number of the light control devices 30, the display devices 40, and the touch devices 50 can be all greater than 1, and the light control devices 30, the display devices 40, and the touch devices 50 may be in a corresponding relationship or a non-corresponding relationship. Here, only a one-to-one corresponding relationship between any two of the light control devices 30, the display devices 40, and the touch devices 50 is described as an example.

The substrate 10 may be a hard substrate or a flexible substrate. The hard substrate may be a glass substrate, and composition material of the glass substrate may comprise at least one of quartz powder, strontium carbonate, barium carbonate, boric acid, boric anhydride, aluminum oxide, calcium carbonate, barium nitrate, magnesium oxide, tin oxide, or zinc oxide. The flexible substrate may be a polymer substrate, which may be at least one of polyethylene, polypropylene, polystyrene, polyethylene terephthalate, polyethylene terephthalate, or polyimide.

The color film substrate 20 may comprise a color film base 201, a plurality of filters 202, and a plurality of shielding portions 203. The color film base 201 may be a glass substrate, and composition material of the glass substrate may comprise at least one of quartz powder, strontium carbonate, barium carbonate, boric acid, boric anhydride, aluminum oxide, calcium carbonate, barium nitrate, magnesium oxide, tin oxide, or zinc oxide. The plurality of filters 202 and the plurality of shielding portions 203 are disposed on one side of the color film base 201 adjacent to the substrate 10, each of the plurality of filters 202 is disposed opposite to the corresponding display device 40, and each of the plurality of shielding portions 203 is disposed between two adjacent filters 202 of different colors for separating the two adjacent filters 202 of different colors. It should be noted that the light control device 30 needs to sense the external light to operate, and therefore the light control device 30 should not be shielded by the shielding portions 203, that is, the color film base 201 has a corresponding gap in an area corresponding to the light control device 30 on the side close to the substrate 10, so that an external light can be irradiated to the light control device 30. In addition, the color film substrate 20 in FIG. 1 only shows relative positional relationship among the color film base 201, the plurality of filters 202, and the plurality of shielding portions 203. As a schematic diagram, the relative positional relationship of the plurality of filters 202, the plurality of shielding portions 203, and the devices on the substrate 10 cannot be limited by FIG. 1.

It is understood that although the substrate 10 and the color film substrate 20 are oppositely disposed, and the light control device 30, the display device 40, and the touch device 50 are disposed on one side of the substrate 10 close to the color film substrate 20, since the light control device 30, the display device 40, and the touch device 50 operate in the first time period, the second time period, and the third time period, respectively, and any two of the first time period, the second time period, and the third time period are not intersected, that is, at any time, only one of the light control device 30, the display device 40, or the touch device 50 transmits signals, and the other two of the light control device 30, the display device 40, or the touch device 50 can be understood to be in a power-off state, that is, one of the light control device 30, the display device 40, or the touch device 50 is not interfered by the other two at any time. The present embodiment improves reliability of the operation of the light control device 30, the display device 40, and the touch device 50 in the display panel 00.

Figure 2:
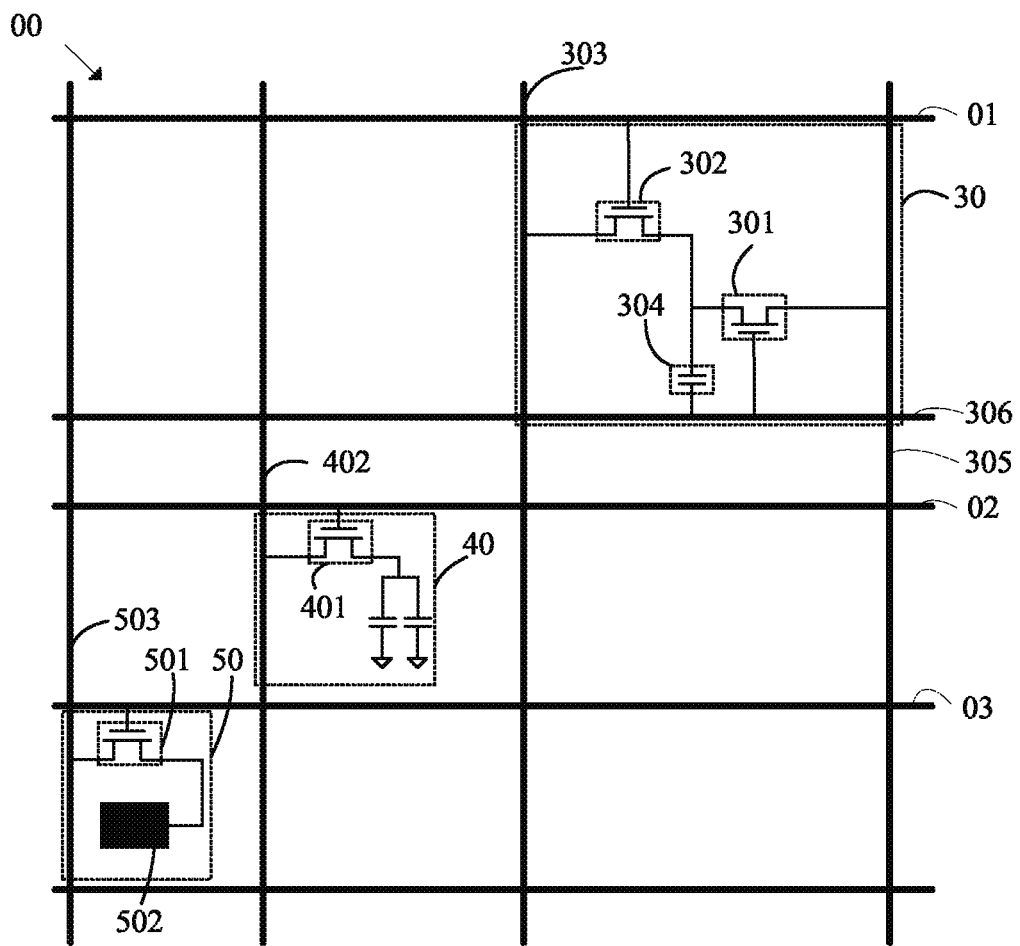
FIG. 2 is a schematic diagram of a circuit of the display panel according to the embodiment of the present disclosure.

In one embodiment, as shown in FIG. 2, the display panel 00 further comprises a light control scan line 01, a display scan line 02, and a touch scan line 03. The light control scan line 01 is electrically connected to the light control device 30 so that the light control device 30 operates during the first time period. The display scan line 02 is electrically connected to the display device 40 so that the display device 40 operates during the second time period. The touch scan line 03 is electrically connected to the touch device 50 so that the touch device 50 operates during the third time period.

Specifically, the light control scan line 01 may transmit a light control scan signal Laser gate to the light control device 30, the display scan line 02 may transmit a display scan signal Display gate to the display device 40, and the touch scan line 03 may transmit a touch scan signal Touch gate to the touch device 50. Further, for the corresponding light control device 30, the display device 40, and the touch device 50, the pulses of the corresponding light control scan signal Laser gate, the display scan signal Display gate, and the touch scan signal Touch gate may be maintained in the first time period, the second time period, and the third time period, respectively, so that the corresponding light control device 30, the display device 40, and the touch device 50 may operate in sequence in the first time period, the second time period, and the third time period.

Figure 3:
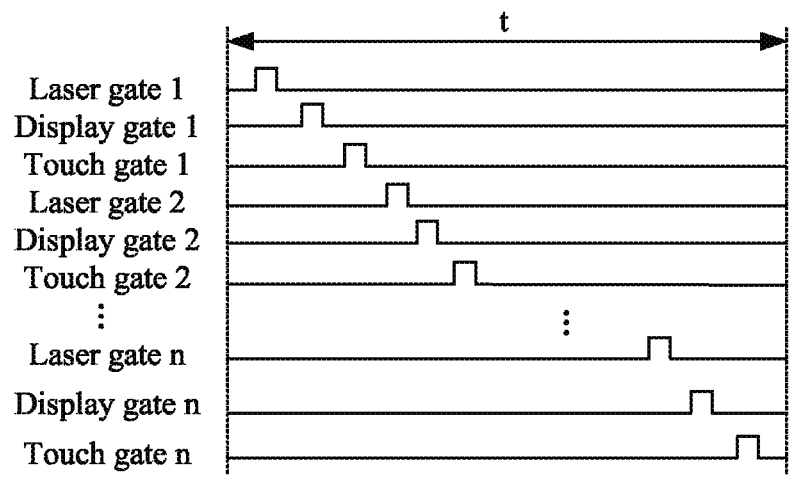
FIG. 3 is a waveform diagram of different scanning signals in the display panel according to the embodiment of the present disclosure.

Further, the display panel 00 may comprise a plurality of light control devices 30, a plurality of display devices 40, and a plurality of touch devices 50. Of course, the display panel 00 may further comprise a plurality of light control scan lines 01, a plurality of display scan lines 02, and a plurality of touch scan lines 03 corresponding to the plurality of light control devices 30, the plurality of display devices 40, and the plurality of touch devices 50, respectively. For example, the plurality of light control devices 30, the plurality of display devices 40, and the plurality of touch devices 50 may be repeatedly arranged in the row and column directions in such a manner as shown in FIG. 2, that is, a matrix is repeatedly arranged in the row and column direction in which a combination of the light control device 30, the display device 40, and the touch device 50 is a minimum unit in which the light control device 30, the display device 40, and the touch device 50 are located in different rows, but the three may be located in the same column or different columns. Assuming that the display panel 00 comprises n of the minimum units, as shown in FIG. 3, for any i-th minimum unit, a duration of the first time period is a delay duration of a pulse in the i-th display scan signal Display gate (i) transmitted to the i-th display device 40, compared to a pulse in the i-th light control scan signal Laser gate (i) transmitted to the i-th light control device 30. A duration of the second time period is a delay duration of a pulse in the i-th touch scan signal Touch gate (i) transmitted to the i-th touch device 50, compared to the pulse in the i-th display scan signal Display gate (i) transmitted to the i-th display device 40. A duration of the third time period is a delay duration of a pulse in the (i+1)-th light control scan signal Laser gate (i+1) transmitted to the (i+1)-th light control device 30, compared to the pulse in the i-th touch scan signal Touch gate (i) transmitted to the i-th touch device 50. In this case, assuming that a total time at which the plurality of the light control devices 30, the plurality of the display devices 40, and the plurality of the touch devices 50 in the display panel 00 are all completed in one frame is t, the corresponding frequency is 1/t.

Figure 4:
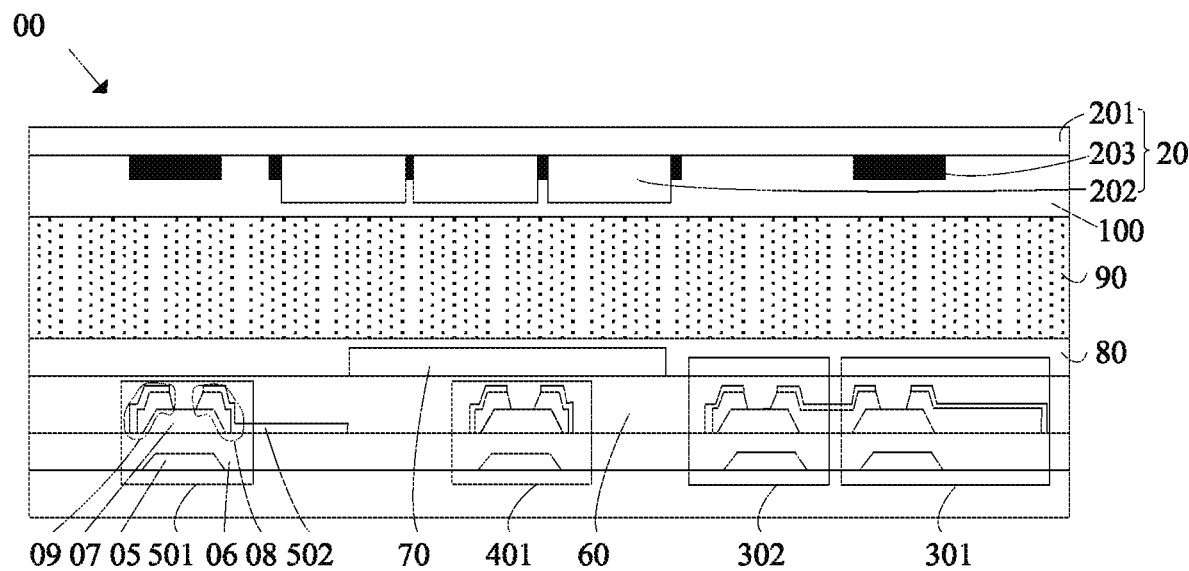
FIG. 4 is a schematic cross-sectional view of another display panel according to an embodiment of the present disclosure.

In one embodiment, as shown in FIG. 4, the light control device 30 comprises a photosensitive thin film transistor 301 and a switching thin film transistor 302 that are electrically connected to each other. The display device 40 comprises a display thin film transistor 401. The touch device 50 comprises a touch thin film transistor 501. Wherein, the photosensitive thin film transistor 301, the switching thin film transistor 302, the display thin film transistor 401, and the touch thin film transistor 501 are disposed in the same layer and formed of the same material. The display thin film transistor 401 and the touch thin film transistor 501 may be simultaneously manufactured on one side of the substrate 10 close to the color film substrate 20. Of course, the light control device 30 may be an architecture comprising three, four, or five thin film transistors.

Specifically, as shown in FIGS. 2 and 4, the structure of the photosensitive thin film transistor 301, the switching thin film transistor 302, the display thin film transistor 401, and the touch thin film transistor 501 may be the same, and will be described herein with reference to the touch thin film transistor 501 as an example. As shown in FIG. 4, the touch thin film transistor 501 comprises a gate electrode 05, a gate insulating layer 06 covering the gate electrode 05, an active layer 07 disposed on the gate insulating layer 06, and a source electrode 08 and a drain electrode 09 disposed on left and right sides of the active layer 07, respectively. Further, the gate insulating layer of the touch thin film transistor 501, the gate insulating layer of the photosensitive thin film transistor 301, the gate insulating layer of the switching thin film transistor 302, and the gate insulating layer of the display thin film transistor 401 may be connected to form a continuous gate insulating layer. The photosensitive thin film transistor 301 and the switching thin film transistor 302 may be arranged in series. For example, the source electrode of the photosensitive thin film transistor 301 may be electrically connected to the drain electrode of the switching thin film transistor 302. Further, the source electrode of the photosensitive thin film transistor 301 and the drain electrode of the switching thin film transistor 302 connected together or integrally formed.

Specifically, the touch thin film transistor 501 is described as an example. The composition material of the active layer 07 may comprise at least one of hydrogenated amorphous silicon, germanium, germanium, or a mixture of silicon. Each of the source electrode 08 and the drain electrode 09 may be a composite layer composed of a copper layer and a molybdenum layer. For example, each of the source electrode 08 and the drain electrode 09 may comprise a copper layer and a molybdenum layer disposed on the copper layer, wherein the molybdenum layer may improve surface characteristics of the copper layer. The photosensitive band of the photosensitive thin film transistor 301 in the light control device 30 may include visible light of a wavelength of 380 nm-780 nm or infrared light of a wavelength of 780 nm-1000 nm.

In one embodiment, as shown in FIGS. 2 and 4, the touch device 50 further comprises: a touch electrode 502 for sensing an external touch and generating a touch signal, and the source electrode 08 of the touch thin film transistor 501 is electrically connected to the touch electrode 502; a touch receiving line 503, the drain electrode 09 of the touch thin film transistor 501 is electrically connected to the touch receiving line 503, and the touch receiving line 503 receives the touch signal through the touch thin film transistor 501.

Specifically, when the source electrode 08 of the touch thin film transistor 501 is electrically connected to the touch electrode 502, when a finger touches the touch electrode 502, the finger and the touch control electrode 502 are coupled to generate a capacitance, and the touch electrode 502 and the finger are capacitive coupled to form two poles of a capacitance, which is equivalent to one capacitance in series, so that a measured capacitance value is increased. Specifically, as shown in FIGS. 2 and 4, the touch scan line 03 in FIG. 2 is electrically connected to the gate electrode 05 of the touch thin film transistor 501, and the drain electrode 09 of the touch thin film transistor 501 is electrically connected to the touch receiving line 503. When a signal in the touch scan line 03 controls the gate electrode 05 to turn off the touch thin film transistor 501, the touch receiving line 503 is electrically separated from the touch electrode 502. When a signal in the touch scan line 03 controls the gate electrode 05 to turn on the touch thin film transistor 501 in the third time period, the touch receiving line 503 is electrically coupled to the touch electrode 502 via the source electrode 08 and the drain electrode 09 of the touch thin film transistor 501, thereby charging the touch electrode 502 and measuring a capacitance value at this time. Similarly, when a finger touches the touch electrode 502, a coupling capacitance is generated between the finger and the touch electrode 502, which causes a value of a self-capacitance to change, and a position coordinate of the touch point is calculated by using a position coordinate corresponding to the touch device 50 whose capacitance value changes. It is understood that the touch mode of the touch device 50 is a matrix self-capacitance touch mode, which enables a higher scan frequency and a higher anti-noise performance.

In one embodiment, as shown in FIG. 4, the touch electrode 502 and the source electrode 08 of the touch thin film transistor 501 are integrally formed such that the source electrode 08 of the touch thin film transistor 501 is electrically connected to the touch electrode 502.

Wherein, when the touch electrode 502 is disposed close to the source electrode 08, the touch electrode 502 and the source electrode 08 may be connected or integrated formed. Further, as shown in FIG. 4, since both the source electrode 08 and the drain electrode 09 may be a composite layer composed of a copper layer and a molybdenum layer, the molybdenum layer on the copper layer may extend toward one side away from the source electrode 08 to form the touch electrode 502, and the thickness of the touch electrode 502 may be 100 nm-1000 nm.

In one embodiment, as shown in FIGS. 2 and 4, the photosensitive thin film transistor 301 is configured to sense external light and generate a photoelectric signal, and the switching thin film transistor 302 is electrically connected to the photosensitive thin film transistor 301. The light control device 30 further comprises a photosensitive read line 303, the photosensitive read line 303 is electrically connected to the switching thin film transistor 302, and the photosensitive read line 303 receives the photoelectric signal through the switching thin film transistor 302.

Further, the source electrode of the switching thin film transistor 302 and the drain electrode of the photosensitive thin film transistor 301 are electrically connected so that the photoelectric signal is transmitted to the switching thin film transistor 302. As shown in FIG. 2, the photosensitive read line 303 is electrically connected to the drain electrode of the switching thin film transistor 302, and the gate electrode of the switching thin film transistor 302 is electrically connected to the light control scan line 01 to control the photosensitive read line 303 to receive the photoelectric signal through the switching thin film transistor 302.

Specifically, as shown in FIG. 2, the light control device 30 further comprises a storage capacitor 304, a first voltage line 305, and a second voltage line 306. Specifically, the gate electrode and the drain electrode of the photosensitive thin film transistor 301 are electrically connected to the second voltage line 306 and the first voltage line 305, respectively. The second voltage line 306 and the first voltage line 305 transmit corresponding operating voltages to the gate electrode and the source electrode of the photosensitive thin film transistor 301, so that the photosensitive thin film transistor 301 is in an operating state. The photosensitive thin film transistor 301 senses external light and generates a photoelectric signal at the source electrode, wherein signals transmitted in the second voltage line 306 and the first voltage line 305 are all constant voltage signals. Both ends of the storage capacitor 304 are electrically connected to the drain electrode of the photosensitive thin film transistor 301 and the second voltage line 306, respectively, and the storage capacitor 304 is configured to store the photoelectric signal. The gate electrode of the switching thin film transistor 302 is electrically connected to the light control scan line 01, signals in the light control scan line 01 cause the switching thin film transistor 302 to turn on in the first time period, and the photosensitive read line 303 receives the photoelectric signal stored in the storage capacitor 304 via the switching thin film transistor 302. It will is understood that when the light control device 30, the display device 40, and the touch device 50 are respectively operated in the first time period, the second time period, and the third time period, respectively, the photosensitive read line 303 in the light control device 30 is not affected by crosstalk of the touch electrode 502 and the pixel electrode in the display device 40 when the light control device 30 is operated. Here, when the number of thin film transistors in the light control device 30 is 2, 3, 4, or 5, respectively, a circuit structure of 2T1C, 3T1C, 4T1C, or 5T1C is formed with the storage capacitor 304, respectively.

In one embodiment, as shown in FIG. 4, the display panel 00 further comprises a passivation layer 60 covering the photosensitive thin film transistor 301, the switching thin film transistor 302, the display thin film transistor 401, the touch thin film transistor 501, and the touch electrode 502, and a plurality of common electrodes 70 located on the passivation layer 60. Each of the plurality of common electrodes 70 may be disposed opposite the corresponding display thin film transistor 401, or may be disposed corresponding to the corresponding display scan line 02 in FIG. 2. Further, the display panel 00 may be a liquid crystal display (LCD) panel. For example, as shown in FIG. 4, the display panel 00 may further comprise an alignment layer covering the plurality of common electrodes 70, a liquid crystal layer 90 located on a side of the alignment layer 80 close to the color film substrate 20, and a protective layer 100 covering a side of the plurality of shielding portions 203 and the plurality of filters 202 close to the liquid crystal layer 90, and the composition material of the alignment layer 80 may include polyimide. It should be noted that the positional relationship between different film layers in the display panel 00 in the present disclosure is not limited to the positional relationship in FIG. 4.

Specifically, when the display scan line 02 in FIG. 2 causes the display thin film transistor 401 to turn on in the second time period, the data signal of the data line 402 reaches the pixel electrode via the source electrode and the drain electrode of the display thin film transistor 401, and a horizontal electric field for driving the rotation of liquid crystals in the liquid crystal layer 90 is formed between the pixel electrode and the common electrode 70 after the data signal is loaded to the pixel electrode. Note that the relative positional relationship of the plurality of common electrodes 70 and the plurality of pixel electrodes in the liquid crystal display panel described herein is not limited, that is, the display mode of the liquid crystal display panel may be any one of in-plane switching (IPS), advanced super dimension switching (ADS), or fringe field switching (FFS). It is understood that when the light control device 30, the display device 40, and the touch device 50 are respectively operated in the first time period, the second time period, and the third time period, the liquid crystals in the liquid crystal layer 90 are not susceptible to crosstalk by an electric field generated by the photosensitive thin film transistor 301 and an electric field generated by the touch thin film transistor 501 when the display device 40 is operated.

It should be noted that for the electrical connection in FIG. 2, for each of the minimum units, a plurality of lines arranged laterally may be moved to a same column, and a plurality of lines arranged longitudinally may be moved to a same row, so that the light control device 30, the display device and the touch device 50 in the minimum unit may be surrounded to a same area.

Figure 5:
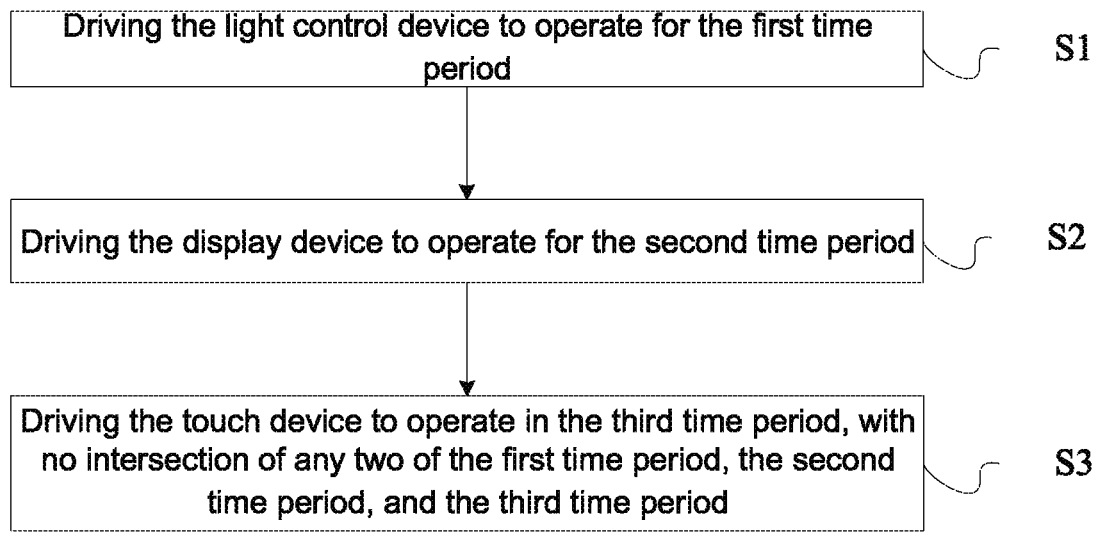
FIG. 5 is a flowchart of a driving method of the display panel according to the embodiment of the present disclosure.

The present disclosure also provides a driving method of a display panel, which is applicable to the display panel as described above. As shown in FIG. 5, the driving method comprises the steps of:

S1, driving the light control device to operate in the first time period;

S2, driving the display device to operate in the second time period; and

S3, driving the touch device to operate in the third time period, wherein any two of the first time period, the second time period, and the third time period are not intersected.

It is understood that, as described above, although the substrate and the color film substrate are oppositely disposed, and the light control device, the display device, and the touch device are disposed on a side of the substrate close to the color film substrate, since the light control device, the display device, and the touch device operate in the first time period, the second time period, and the third time period, respectively, and any two of the first time period, the second time period, and the third time period are not intersected, that is, at any time, only one of the light control device 30, the display device, or the touch device transmits signals, the other two of the light control device 30, the display device, or the touch device may be understood to be in a power-off state, that is, one of the light control device, the display device, or the touch device for transmitting signals at any time is not interfered by the other two. This embodiment improves reliability of operation of the light control device, the display device, and the touch device in the display panel.

In one embodiment, the display panel further comprises the light control scan line, the display scan line, and the touch scan line. The light control scan line is electrically connected to the light control device, the display scan line is electrically connected to the display device, and the touch scan line is electrically connected to the touch device. Wherein, the step of driving the light control device to operate in the first time period comprises driving the light control scan line to drive the light control device to operate in the first time period. The step of driving the display device to operate in the second time period comprises driving the display scan line to drive the display device to operate in the second time period. The step of driving the touch device to operate in the third time period comprises driving the touch scan line to drive the touch device to operate in the third time period.

Specifically, the light control scan line may transmit the light control scan signal Laser gate to the light control device, the display scan line may transmit the display scan signal Display gate to the display device, and the touch scan line may transmit the touch scan signal Touch gate to the touch device. Further, for the corresponding light control device, the display device, and the touch device, pulses in the corresponding light control scan signal Laser gate, the display scan signal Display gate, and the touch scan signal Touch gate may be maintained in the first time period, the second time period, and the third time period, respectively, so that the corresponding light control device, the display device, and the touch device may operate in the first time period, the second time period, and the third time period in sequence.

Further, the display panel may comprise a plurality of light control devices, a plurality of display devices, and a plurality of touch devices. For example, the plurality of light control devices, the plurality of display devices, and the plurality of touch devices may be repeatedly arranged in a column direction with reference to the manner shown in FIG. 2 above. Assuming that the display panel comprises n of the minimum units, with reference to the timing shown in FIG. 3 above, for any i-th minimum unit, a duration of the first time period is a delay duration of a pulse in the i-th display scan signal Display gate (i) transmitted to the i-th display device, compared to a pulse in the i-th light control scan signal Laser gate (i) transmitted to the i-th light control device. A duration of the second time period is a delay duration of a pulse in the i-th touch scan signal Touch gate (i) transmitted to the i-th touch device, compared to the pulse in the i-th display scan signal Display gate (i) transmitted to the i-th display device. A duration of the third time period is a delay duration of a pulse in the (i+1)-th light control scan signal Laser gate (i+1) transmitted to the (i+1)-th light control device, compared to the pulse in the i-th touch scan signal Touch gate (i) transmitted to the i-th touch device. In this case, assuming that a total time at which the plurality of the light control devices 30, the plurality of the display devices 40, and the plurality of the touch devices 50 in the display panel 00 are all completed in one frame is t, the corresponding frequency is 1/t.

The present disclosure provides a display panel and a driving method thereof. The display panel comprises a substrate, a color film substrate, a light control device, a display device, and a touch device. The substrate and the color film substrate are oppositely disposed, the light control device, the display device, and the touch device are disposed on a side of the substrate close to the color film substrate, and the light control device, the display device, and the touch device are set to operate in the first time period, the second time period, and the third time period, respectively, with no intersection of any two of the first time period, the second time period, and the third time period. In this solution, it is possible to reduce the parasitic capacitance between the electrodes of the touch sensor and the electrodes of the light sensor so as to reduce the crosstalk of signals on the two electrodes, thereby improving the reliability of the operation of the touch sensor and the light sensor in the display panel, by providing the light control device, the display device and the touch device to operate at different time periods, that is, preventing simultaneous operation of the three.

The structure of the display panel and the driving method thereof according to the embodiment of the present disclosure are described in detail, and the principles and embodiments of the present disclosure are described herein using specific examples. The description of the above embodiment is merely provided to help understand the technical solution and the core idea of the present disclosure. It is understood by those of ordinary skill in the art that modifications may still be made to the technical solutions described in the foregoing embodiments, or equivalents may be made to some of the technical features therein. These modifications or substitutions do not depart the essence of the corresponding technical solutions from the scope of the technical solutions of the various embodiments of the present disclosure.

What is claimed is:

1. A display panel, wherein the display panel comprises a substrate, a light control device, a display device, and a touch device; the light control device, the display device, and the touch device are disposed on the substrate; the light control device, the display device, and the touch device are respectively operated in a first time period, a second time period, and a third time period, and any two of the first time period, the second time period, and the third time period are not intersected; wherein the light control device comprises a photosensitive thin film transistor and a switching thin film transistor electrically connected to each other, the display device comprises a display thin film transistor, and the touch device comprises a touch thin film transistor; and the photosensitive thin film transistor, the switching thin film transistor, the display thin film transistor, and the touch thin film transistor are disposed in a same layer and formed of a same material;
wherein the display panel further comprises:
a light control scan line electrically connected to the light control device so that the light control device operates in the first time period;
a display scan line electrically connected to the display device so that the display device operates in the second time period; and
a touch scan line electrically connected to the touch device so that the touch device operates in the third time period.

2. The display panel of claim 1, wherein the touch device further comprises:
a touch electrode configured to sense external touch and generate a touch signal, wherein a source electrode of the touch thin film transistor is electrically connected to the touch electrode; and
a touch receiving line, wherein a drain electrode of the touch thin film transistor is electrically connected to the touch receiving line, and the touch receiving line receives the touch signal through the touch thin film transistor.

3. The display panel of claim 2, wherein the touch electrode and the source electrode of the touch thin film transistor are integrally formed so that the source electrode of the touch thin film transistor is electrically connected to the touch electrode.

4. The display panel of claim 1, wherein the photosensitive thin film transistor is configured to sense external light and generate a photoelectric signal, a source electrode of the switching thin film transistor and a drain electrode of the photosensitive thin film transistor are electrically connected such that the photoelectric signal is transmitted to the switching thin film transistor, and the light control device further comprises:
a photosensitive read line electrically connected to a drain electrode of the switching thin film transistor, and a gate electrode of the switching thin film transistor electrically connected to the light control scan line to control the photosensitive read line to receive the photoelectric signal through the switching thin film transistor.

5. The display panel of claim 1, wherein the display panel further comprises:
a passivation layer covering the photosensitive thin film transistor, the switching thin film transistor, the display thin film transistor, the touch thin film transistor, and the touch electrode; and
a plurality of common electrodes on the passivation layer, wherein each of the common electrodes and the corresponding display thin film transistor are oppositely disposed.

6. The display panel of claim 1, wherein the display panel further comprises:
a color film substrate opposite to the substrate, and the light control device, the display device, and the touch device are disposed on one side of the substrate close to the color film substrate.

7. The display panel of claim 6, wherein the color film substrate comprises a color film base, a plurality of filters, and a plurality of shielding portions;
wherein the plurality of filters and the plurality of shielding portions are disposed on one side of the color film base close to the substrate, each of the filters is disposed opposite to the corresponding display device, and each of the shielding portions is disposed between two adjacent filters of different colors.

8. A display panel, wherein the display panel comprises a substrate, a light control device, a display device, and a touch device; and the light control device, the display device, and the touch device are disposed on the substrate;
wherein the light control device, the display device, and the touch device are respectively operated in a first time period, a second time period, and a third time period, and any two of the first time period, the second time period, and the third time period are not intersected.

9. The display panel of claim 8, wherein the display panel further comprises:
a light control scan line electrically connected to the light control device so that the light control device operates in the first time period;
a display scan line electrically connected to the display device so that the display device operates in the second time period; and
a touch scan line electrically connected to the touch device so that the touch device operates in the third time period.

10. The display panel of claim 8, wherein the light control device comprises a photosensitive thin film transistor and a switching thin film transistor electrically connected to each other, the display device comprises a display thin film transistor, and the touch device comprises a touch thin film transistor;

wherein the photosensitive thin film transistor, the switching thin film transistor, the display thin film transistor, and the touch thin film transistor are disposed in a same layer and formed of a same material.

11. The display panel of claim 10, wherein the touch device further comprises:
a touch electrode configured to sense external touch and generate a touch signal, wherein a source electrode of the touch thin film transistor is electrically connected to the touch electrode; and
a touch receiving line, wherein a drain electrode of the touch thin film transistor is electrically connected to the touch receiving line, and the touch receiving line receives the touch signal through the touch thin film transistor.

12. The display panel of claim 11, wherein the touch electrode and the source electrode of the touch thin film transistor are integrally formed so that the source electrode of the touch thin film transistor is electrically connected to the touch electrode.

13. The display panel of claim 10, wherein the photosensitive thin film transistor is configured to sense external light and generate a photoelectric signal, a source electrode of the switching thin film transistor and a drain electrode of the photosensitive thin film transistor are electrically connected such that the photoelectric signal is transmitted to the switching thin film transistor, and the light control device further comprises:
a photosensitive read line electrically connected to a drain electrode of the switching thin film transistor, and a gate electrode of the switching thin film transistor electrically connected to the light control scan line to control the photosensitive read line to receive the photoelectric signal through the switching thin film transistor.

14. The display panel of claim 10, wherein the display panel further comprises:
a passivation layer covering the photosensitive thin film transistor, the switching thin film transistor, the display thin film transistor, the touch thin film transistor, and the touch electrode; and
a plurality of common electrodes on the passivation layer, wherein each of the common electrodes and the corresponding display thin film transistor are oppositely disposed.

15. The display panel of claim 8, wherein the display panel further comprises:
a color film substrate opposite to the substrate, and the light control device, the display device, and the touch device are disposed on one side of the substrate close to the color film substrate.

16. The display panel of claim 15, wherein the color film substrate comprises a color film base, a plurality of filters, and a plurality of shielding portions;
wherein the plurality of filters and the plurality of shielding portions are disposed on one side of the color film base close to the substrate, each of the filters is disposed opposite to the corresponding display device, and each of the shielding portions is disposed between two adjacent filters of different colors.

17. A driving method of a display panel, wherein the driving method is applicable to the display panel according to any one of claims 8-14, the driving method comprises:
a step of driving the light control device to operate in the first time period;
a step of driving the display device to operate in the second time period; and
a step of driving the touch device to operate in the third time period, with no intersection of any two of the first time period, the second time period, and the third time period.

18. The driving method of claim 17, wherein the display panel further comprises a light control scan line, a display scan line, and a touch scan line, wherein the light control scan line is electrically connected to the light control device, the display scan line is electrically connected to the display device, and the touch scan line is electrically connected to the touch device; wherein,
the step of driving the light control device to operate in the first time period comprises driving the light control scan line to drive the light control device to operate in the first time period;
the step of driving the display device to operate in the second time period comprises driving the display scan line to drive the display device to operate in the second time period; and
the step of driving the touch device to operate in the third time period comprises driving the touch scan line to drive the touch device to operate in the third time period.

\* \* \* \* \*